Feb. 20, 1934.   W. J. ARMSTRONG   1,947,784
CRUSHING APPARATUS
Filed Feb. 25, 1930   2 Sheets-Sheet 1
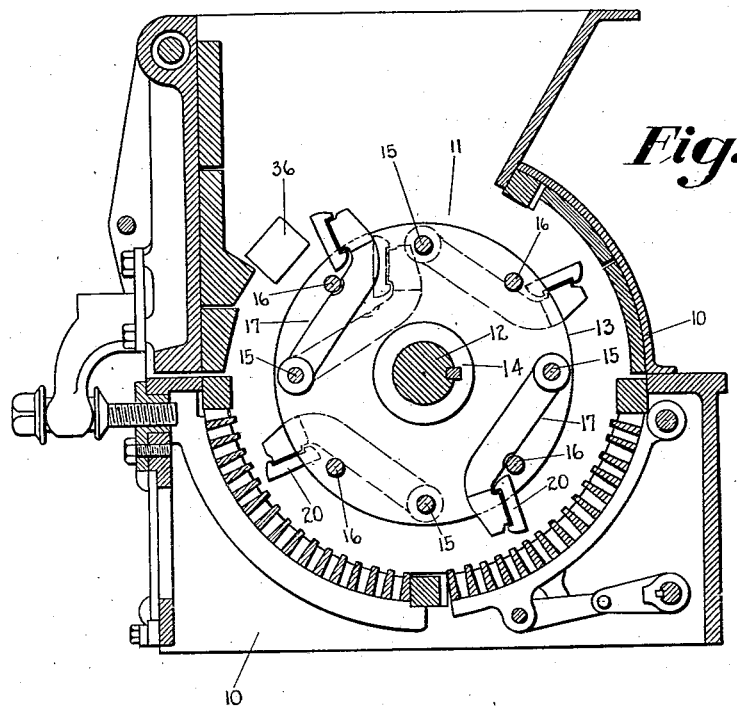
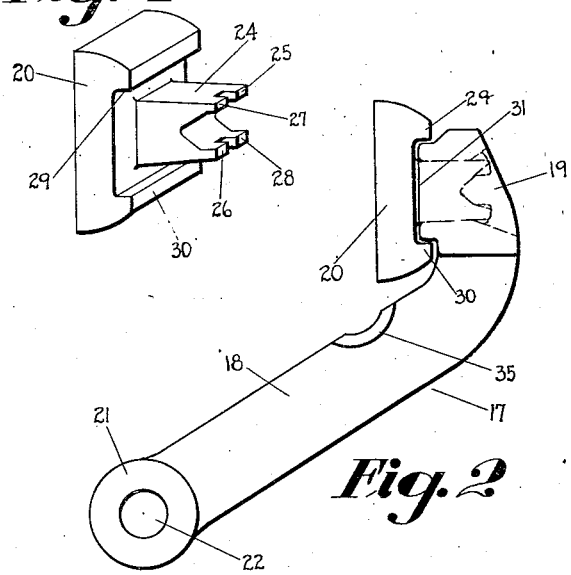
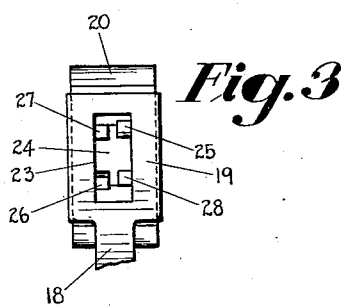
Inventor
Walter J. Armstrong.
Attorneys Feb. 20, 1934.  W. J. ARMSTRONG  1,947,784
CRUSHING APPARATUS
Filed Feb. 25, 1930  2 Sheets-Sheet 2

Inventor
Walter J. Armstrong
Attorneys

Patented Feb. 20, 1934

1,947,784

UNITED STATES PATENT OFFICE 1,947,784

CRUSHING APPARATUS

Walter J. Armstrong, Columbus, Ohio, assignor to The Jeffrey Manufacturing Company, Columbus, Ohio, a corporation of Ohio Application February 25, 1930. Serial No. 431,215

20 Claims. (Cl. 83—11)

The present invention relates to rotary crushing apparatus, particularly of the type in which the rotor is equipped with pivotally mounted beaters having heads adapted to be projected and held in operative position under the influence of centrifugal force.

According to the invention, a novel form of beater is provided, the beater having a removable head adapted to be secured in working position by means novel in themselves. Further, the new beater enters into a particular combination with the rotor structure.

The beaters according to the present invention are not projected outwardly of the rotor on a radial line as has been usual in the past, but they are pivoted adjacent the rotor periphery, and abutments cooperate with them to restrain their outward movement so that the beater head alone projects beyond the rotor periphery, the main body of the beater lying in substantially secantial relation to the rotor. According to the invention, the beaters are provided with removable wearing pieces, preferably of resilient material, which make contact with the abutments, and thus save wear on the beaters themselves.

In the accompanying drawings:

Figure 1 is a vertical transaxial section of a crushing machine embodying the present invention.

Figure 2 is an enlarged side elevation of one of the beaters.

Figure 3 is a rear elevation of the distal end of the beater.

Figure 4 is a perspective of a renewable head.

Figure 5:
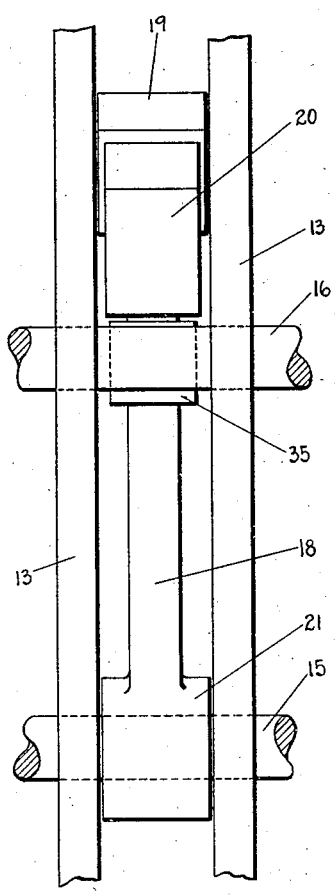
Figure 5 is a plan view of one of the beaters and associated parts of the rotor body.

Referring to the drawings, reference numeral 10 designates a rotor casing of well-known type having mounted therein a rotor generally designated at 11. The rotor comprises a shaft 12 suitably journaled in the casing walls and having keyed thereto a number of discs 13. Discs 13 are separated by spacing collars 14 and are locked on shaft 12 against axial displacement relative thereto. Extending throughout the discs 13 through alined apertures formed therein are the pivot rods 15 parallel to shaft 12. Abutment rods 16 extend throughout the discs in a manner similar to rods 15. The beaters, generally indicated at 17, are pivotally mounted on rods 15 and their movement outwardly of the rotor body limited by abutment with rods 16. The beaters are of considerable length and each when fully projected preferably lies substantially as the base of a substantially isosceles triangle whose sides are radii of the rotor touching the extremities of the beater and whose apex angle is at least 60°. Referring particularly to Figures 2 to 5, each beater is constituted by an elongated body portion 18, a neck portion 19, and a head portion 20. At the opposite end from head 20 the beater is provided with a boss 21 having a bore 22 in which a rod 15 is engaged. Neck portion 19, or at least a part thereof, is of the same thickness as boss 21, as is particularly shown in Figure 5, this thickness being such as to afford a rather close sliding contact with the adjacent discs 13, thereby preventing play of the beater in an axial direction between the discs.

Neck 19 is provided with a socket 23 which extends in the plane of the neck and body portions, and is adapted to receive a shank 24 of head 20. Socket 23 is somewhat tapered in the inward direction and is of polygonal cross section, shank 24 being similarly tapered and of similar cross section. On the rear extremity of the shank are formed a series of prongs or claws 25, 26, 27 and 28. The rear portion of socket 23 is flared as is evident from Figure 2, and when shank 24 is in operative position, one or more of prongs 25 to 28 may be bent so as to engage the tapered rear portion of the socket and thus secure the shank in position. Preferably the diagonally opposite prongs 25 and 26 will be thus bent and they will be hammered in a somewhat diagonal direction so that all four walls of the socket, as are shown, will be tightly engaged. When the head 20 becomes worn, it may be removed from socket 23 by returning prongs 25 and 26 to their original position, the head rotated 180°, and the shank reinserted in the socket and secured in position by means of prongs 27 and 28.

Head 20 preferably has a substantially plane working face perpendicular to shank 24 and substantially radial to the rotor when it is in its fully projected position. The rear face of the head is preferably substantially parallel to the front face but has upper and lower flanges 29 and 30 embracing a raised surface 31 of the neck portion 19, this latter surface being substantially parallel to the rear surface of head portion 20. Due to this arrangement, shank 24 will be relieved from the effects of distortive forces, since, in use, the rear surface of head 20 will seat evenly against surface 31 of the neck portion. As can be seen from Figure 1, impacts on head 20 are exerted in the longitudinal direction of shank 24.

Flanges 29 and 30 tend to preserve shank 24 from the effects of torsional forces, and they also serve to take a portion of the wear which would otherwise be received by the neck portion.

Figure 6:
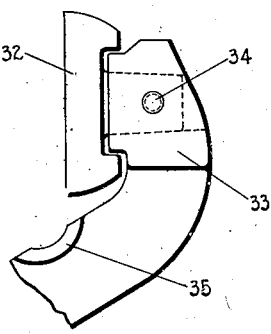
Figure 6 is a side elevation of a portion of a beater showing a certain modification.

As shown in Figure 6, the shank of a head 32 is merely provided with an aperture registering with similar apertures in the walls of the socket in a neck 33, and a pin 34 is passed through the apertures to hold the parts in place.

As shown in Figures 1, 2, 5 and 6, the beater bodies are provided with laterally expanded contact portions 35 adapted to engage abutment rods 16, these portions projecting laterally of the body portion to a somewhat lesser extent than neck 19 and boss 22.

It has been found in practice that the beater heads are apt to become expanded due to the impacts to which they are continuously subjected. If the beater head encounters an unpulverable article as at 36, Figure 1, it will be driven back entirely within the peripheral outlines of the rotor body to the dotted line position shown. It frequently occurs that due to the above mentioned expansion of the head the latter will fail to be projected again under centrifugal force, but must be pried out and the head removed and replaced, thus giving rise to a considerable loss of time. For this reason, according to the present invention, the head is made substantially narrower than the neck portion 19 and boss 21, and is centered on the neck portion so as to afford a substantial clearance between the adjacent discs 13. Due to this proportionment and arrangement of parts, the head may be considerably battered out of shape without danger of expanding to such a degree as to interfere with the free movement of the beater relative to the discs, and the same may be said of the contact portion 25.

Figure 7:
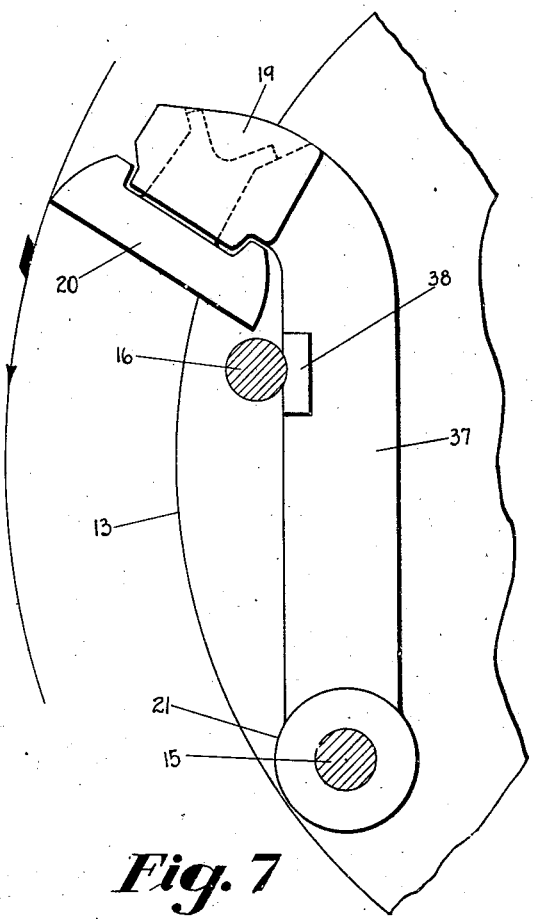
Figure 7 is a side elevation of a beater and associated portions of the rotor and especially illustrating the wear piece referred to above.

According to Figure 7, I have provided the beater body 37 with a wear piece 38 of some metal having a greater fatigue value than the metal of which the beater body is commonly formed or of some such resilient material as rubber, this wearing piece being positioned to engage the abutment rod 16 to limit outward movement of the beater. The wear or contact piece 38 may be held in position by being sprung into a suitable recess or fastened into position by means of a bolt, rivet, or the like, and is thus readily replaceable when worn out. The wear at this contact point, it may be explained, is not due to heavy impact due to the hammers being thrown violently outward under centrifugal force, but rather to a more or less continual chattering or intermittent contact due to the difficulty of exactly proportioning the weight of the hammers and speed of the machine to the various services to which these machines are applied and the variations in size, weight, and hardness of the material being crushed.

While I have mentioned the working surfaces of the beater heads as being "substantially radial" relative to the rotor axis when they are in fully projected position, it will be noted that actually they are somewhat rearwardly and outwardly inclined relative to the radial. This is for the purpose of preventing a locking engagement with unpulverable objects as otherwise might occur. The inward movement of the beaters, caused by counter-action of centrifugal force due to the encountering of unpulverable objects or by cessation of centrifugal force due to arrest of rotor rotation, is limited by collars 14.

The metal of the beater heads is of such characteristics as to withstand the continual wear to which it is subjected while yet permitting the prongs to be bent over without breaking. I preferably form the beater heads of 12% manganese steel, this metal possessing the required characteristics. However, a steel may be used which can be heat treated to provide a wearing face of sufficient hardness and annealed at the shank to render the prongs deformable. The beater arms are preferably made of cast manganese molybdenum steel heat treated for high strength and toughness but not to a high degree of hardness for resistance to wear such as is required in the beater head.

It will be understood that many deviations are possible from the illustrated embodiment of the invention without departure from its scope, and I do not limit myself except as determined in the following claims.

I claim:

1. In a machine of the class described, a rotor body comprising parallel discs spaced longitudinally of the rotor axis and perpendicular thereto, a beater comprising an elongated body portion, a neck portion at the other end of the body portion extending at an angle to the latter, said neck portion being movable between the discs substantially in contact with the opposed surfaces thereof, a socket in the neck portion extending in the plane of said body and neck portions, a separable head portion, and a shank on said head portion engaged in said socket, said head portion having a working face forming an obtuse angle with the body portion and being of less width than the neck portion.

2. In a machine of the class described, a rotor body comprising parallel discs spaced longitudinally of the rotor axis and perpendicular thereto, a beater comprising an elongated body portion pivoted at one end between said discs, a neck portion at the other end of the body portion extending at an angle to the latter, said neck portion being of greater thickness than the body portion and movable between the discs substantially in contact with the opposed surfaces thereof, a socket in the neck portion extending in the plane of said body and neck portions, a separable head portion, and a shank on said head portion engaged in said socket, said head portion having a working face forming an obtuse angle with the body portion and being of less width than the neck portion.

3. A beater comprising an elongated body portion, a neck portion at one end of the body portion and extending at an angle to the latter, the neck portion being of greater thickness than the body portion, a socket in the neck portion extending in the plane of said body and neck portions, a separable head portion, and a shank on said head portion engaged in said socket, said head portion having a working face forming an obtuse angle with the body portion and being of less width than the neck portion, there being a boss formed on the other end of said body portion of substantially the same thickness as the neck portion.

4. A beater comprising an elongated member having a socket of polygonal cross section formed in an end thereof, a head portion, a shank on said head portion engaged in said socket, said shank being of polygonal cross section and provided at its end with diagonally disposed prongs engageable with the walls of the socket to retain the shank in the latter.

5. A beater comprising an elongated member having a socket of polygonal cross section formed in an end thereof, a head portion, a shank on said head portion engaged on said socket, said shank being of polygonal cross section and provided at its end with a plurality of sets of diagonally disposed prongs, those of each set being engageable with the walls of the socket to retain the shank in the latter.

6. In a machine of the class described, a rotor body, a beater pivoted to the rotor body adjacent the periphery and on an axis parallel to the axis of the rotor body, said beater having an angular neck centrifugally projectible beyond the rotor body periphery with the main portion of the beater body in substantially secantial relation, abutment means on the rotor body for limiting the projection of the beater neck, a beater head having a substantially plane working surface, a shank on the opposite side of the head from said surface, and a socket in said neck in which the shank is received for supporting the head with its working surface substantially radial to the rotor body when the beater neck is in fully projected position.

7. In a machine of the class described, a rotor body, a beater pivoted to the rotor body adjacent the periphery and on an axis parallel to the axis of the rotor body, said beater having an angular neck centrifugally projectible beyond the rotor body periphery with the main portion of the beater body in substantially secantial relation, abutment means on the rotor body for limiting the projection of the beater neck, a beater head having a substantially plane working surface, a shank on the opposite side of the head from said surface and substantially perpendicular to the latter, and a socket in said neck in which the shank is received for supporting the head with its working surface substantially radial to the rotor body when the beater neck is in fully projected position.

8. In a machine of the class described, a rotor body, a beater pivoted to the rotor body adjacent the periphery and on an axis parallel to the axis of the rotor body, said beater having an angular neck centrifugally projectible beyond the rotor body periphery with the main portion of the beater body in substantially secantial relation, abutment means on the rotor body for limiting the projection of the beater neck, a beater head having a substantially plane working surface, a shank on the opposite side of the head from said surface, and a socket in said neck in which the shank is received for supporting the head with its working surface substantially radial to the rotor body when the beater neck is in fully projected position, the beater head being entirely retractible within the rotor body periphery upon cessation or counteraction of centrifugal force.

9. In a machine of the class described, a rotor body, a beater pivoted to the rotor body adjacent the periphery and on an axis parallel to the axis of the rotor body, said beater having an angular neck centrifugally projectible beyond the rotor body periphery with the main portion of the beater body in substantially secantial relation, abutment means on the rotor body for limiting the projection of the beater, a beater head having a substantially plane working surface and a rear surface parallel to the latter, a shank projecting rectangularly from said rear surface, and a socket in said neck in which the shank is received for supporting the head with its working surface substantially radial to the rotor body when the beater neck is in fully projected position, said neck having a surface underlying the rear surface of the head and parallel thereto.

10. In a machine of the class described, a rotor body, a beater pivoted to the rotor body adjacent the periphery and on an axis parallel to the axis of the rotor body, said beater having an angular neck centrifugally projectible beyond the rotor body periphery with the main portion of the beater body in substantially secantial relation, abutment means on the rotor body for limiting the projection of the beater, a beater head having a substantially plane working surface and a rear surface parallel to the latter, a shank projecting rectangularly from said rear surface, and a socket in said neck in which the shank is received for supporting the head with its working surface substantially radial to the rotor body when the beater neck is in fully projected position, said neck having a raised surface underlying the rear surface of the head and parallel thereto, said rear surface having opposite end flanges embracing said raised surface.

11. In a machine of the class described, a rotor comprising a revoluble shaft, a plurality of discs fixed on said shaft in axially spaced relation, beaters pivoted between adjacent ones of said discs each on an axis adjacent the disc peripheries and parallel to said shaft, each beater having an angular neck centrifugally projectible beyond the disc peripheries with the main portion of the beater body in substantially secantial relation, abutment means on the rotor body for preventing projection of the beater necks beyond the desired limit, each beater neck having a replaceable head mounted thereon of substantially less thickness than the distance between the adjacent discs, and means for centering the beaters between the adjacent discs.

12. In a machine of the class described, a rotor comprising a revoluble shaft, a plurality of discs fixed on said shaft in axially spaced relation, beaters pivoted between adjacent ones of said discs each on an axis adjacent the disc peripheries and parallel to said shaft, each beater having an angular neck centrifugally projectible beyond the disc peripheries with the main portion of the beater body in substantially secantial relation, abutment means on the rotor body for preventing projection of the beater necks beyond the desired limit, each beater neck having a replaceable head mounted thereon of substantially less thickness than the distance between the adjacent discs, the necks of said beaters being of a thickness to give a close sliding fit between the adjacent discs and the heads being centered on the necks to give a substantial clearance between each side of the heads and the discs.

13. In a machine of the class described, a rotor comprising a revoluble shaft, a plurality of discs fixed on said shaft, in axially spaced relation, beaters pivoted between adjacent ones of said discs each on an axis adjacent the disc peripheries and parallel to said shaft, each beater having an angular neck contrifugally projectible beyond the disc peripheries with the main portion of the beater body in substantially secantial relation, abutment means on the rotor body for preventing projection of the beater necks beyond the desired limit, each beater neck having a replaceable head mounted thereon of substantially less thickness than the distance between the adjacent discs, the necks of said beaters being of a thickness to give a close sliding fit between the adjacent discs and the heads being centered on the necks to give a substantial clearance between each side of the heads and the discs, and a boss on each beater at its point of pivotal mounting, the bosses being of the same thickness as the necks.

14. In a machine of the class described, a rotor body, a beater pivoted to the rotor body and having an end centrifugally projectible beyond the rotor body periphery, an abutment on the rotor body engageable by the beater to limit the projection of the latter, and a replaceable wear piece mounted on the beater for contact with the abutment.

15. In a machine of the class described, a rotor body, a beater pivoted to the rotor body and having an end centrifugally projectible beyond the rotor body periphery, an abutment on the rotor body engageable by the beater to limit the projection of the latter, and a replaceable wear piece of resilient material mounted on the beater for contact with the abutment.

16. In a machine of the class described, a rotor body comprising parallel discs spaced longitudinally of the rotor axis and perpendicular thereto, a beater comprising an elongated body portion pivoted at one end between said discs, a neck portion, said neck portion being movable between the discs substantially in contact with the exposed surfaces thereof, and an impact head on the neck portion, the neck portion being wider than the head.

17. In a machine of the class described, a rotor body comprising parallel discs spaced longitudinally of the rotor axis and perpendicular thereto, a beater comprising an elongated body portion pivoted at one end between said discs, a neck portion, said neck portion being movable between the discs substantially in contact with the exposed surfaces thereof, and an impact head on the neck portion, the neck portion being wider than the head and body portion.

18. In a machine of the class described, a rotor body comprising parallel discs spaced longitudinally of the rotor axis and perpendicular thereto, a beater comprising an elongated body portion pivoted at one end between said discs, a neck portion, said neck portion being movable between the discs substantially in contact with the exposed surfaces thereof, an impact head on the neck portion, the neck portion being wider than the head, and a boss at the pivoted end of the body portion substantially equal in width to the neck portion.

19. In a machine of the class described, a rotor, a plurality of series of beaters pivoted to the rotor adjacent the periphery thereof, the series of beaters being spaced longitudinally of the rotor and each series comprising a pair of beaters having diametrically opposite pivot points, the pivot points of one series being substantially at right angles to the diametric line of the pivot points of the succeeding series, heads on the beaters centrifugally projectible beyond the rotor periphery, and means on the rotor to engage a medial portion of the beaters for limiting such projection, the beater heads being movable inwardly of the rotor in non-projecting relation thereto upon cessation or counteraction of the centrifugal force, each beater having an effective length substantially equal to the distance between its pivot point and a pivot point of the succeeding series and each beater comprising an arm portion substantially within the rotor outlines in the position of maximum projection of its head.

20. In apparatus of the class described, the combination with a rotor, of a beater pivoted to the rotor near the periphery thereof and comprising an elongated arm and a head at the outer end of said arm with a working face adapted to be projected by centrifugal force from the periphery of said rotor, said working face receding to a position within the peripheral outlines of the rotor when the centrifugal force is counteracted, and means on the rotor engageable by the beater arm for limiting the projection of said working face, the beater, in the position of maximum projection of said working face, being positioned substantially as the base of a substantially isosceles triangle whose apex is at the rotor axis and whose apex angle is at least sixty degrees, the sides of said triangle being radii of the rotor touching the extremities of the beater.

WALTER J. ARMSTRONG.